Aug. 12, 1941.   S. L. WORTHEN   2,252,337
ORIFICE DISK
Filed May 2, 1940
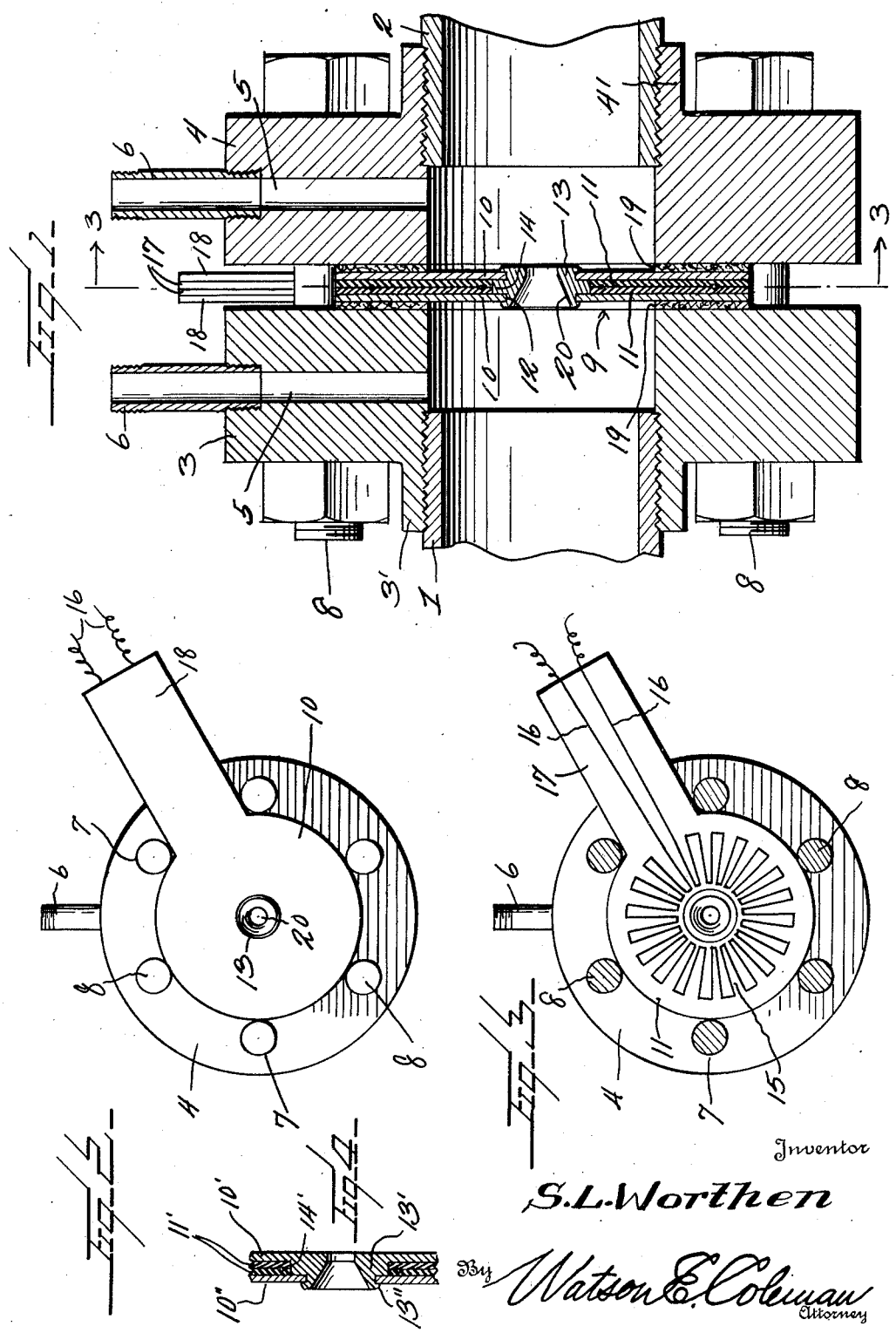
Inventor
S. L. Worthen
By Watson E. Coleman
Attorney Patented Aug. 12, 1941

2,252,337

UNITED STATES PATENT OFFICE 2,252,337

ORIFICE DISK

Sidney Lee Worthen, Garnett, Kans.

Application May 2, 1940, Serial No. 333,055

5 Claims. (Cl. 219—19)

This invention relates to the art of metering and regulating gas and compressed air in gas lines, and pertains particularly to improvements in the orifice disk employed in such procedure.

In the use of an orifice disk or orifice union in a pipe line when metering and regulating gas and compressed air, difficulty is encountered in winter or freezing weather with ice accumulating against one side of the disk and interfering with the passage of gas through the orifice thereof.

The primary object of the present invention is to provide an orifice disk having means associated therewith for preventing such accumulation or formation of ice so that the flow of gas through the orifice may proceed uninterruptedly.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view illustrating in longitudinal section a pipe line at an orifice union showing the disk embodying the present invention in position in the union and in section.

Fig. 2 is a view looking toward one section of the union and showing the disk of the present invention in elevation thereagainst.

Fig. 3 is a sectional view taken on the line 3—3 of Fig. 1.

Fig. 4 is a fragmentary sectional view through the central portion of a disk constructed in accordance with the present invention, showing a modification of the construction of the hub thereof.

Referring now more particularly to the drawing, the numerals 1 and 2 designate adjacent ends of a pipe line, which ends are connected together by a union constructed to facilitate the attachment of a meter to the line for metering the flow of gas through the pipes. This union is of standard construction and consists of the disks 3 and 4, which are flanged as indicated at 3', 4' for threaded connection respectively with the pipes 1 and 2. Each of these disks is provided with a radial bore 5 and each bore has a nipple 6 connected therewith to facilitate the attachment of two sides of a metering device to the union.

The disks or flanges 3 and 4 are provided with axially directed bolt apertures 7 which are alined for the reception of coupling bolts 8 by which the disks or flanges may be drawn together.

The orifice disk embodying the present invention is indicated generally by the numeral 9 and is interposed between the disks or flanges 3 and 4, as illustrated in Fig. 1. This orifice disk comprises two body disks 10 which are disposed in coaxial relation and have interposed between them sheets or disks of insulation such as asbestos or the like, indicated by the numeral 11. Each of the disks 10 has a central aperture 12 and the insulation disks are likewise apertured but are provided with apertures of slightly larger diameter than the apertures 12 of the body disk.

The numeral 13 indicates a hub which extends through the alined apertures 12 of the body disks and which has intermediate its ends a rib 14 which positions in the apertures of the insulation disks 11 and lies between the disks 10 and coacts with the insulation disks 11 to hold the body disks 10 in spaced relation. The ends of the hub 13 are swaged over against the outer surfaces of the body disks as shown, so as to lock these disks and the insulation disks into a unitary structure.

Interposed between the insulation disks is a coil 15 of electric current resistance wire. This coil has its two ends 16 extended radially with respect to the disks in side by side relation and passing between radial arms 17 forming continuations of the insulation disks 11.

The body disks 10 also have radially extended arms 18 between which the insulation disk arms 17 lie and these several arms together form a handle for the device by which it may be inserted and maintained in proper position between the flanges 3 and 4 while the latter are being drawn together by the bolts 8. By this means it will be seen that the orifice disk is firmly clamped between the flanges 3 and 4, and in order to prevent leakage, the two faces of the orifice disk have gaskets 19 placed thereagainst which contact the adjacent flanges.

The hub 13 is provided with an axial passage 20 which tapers from one end to the other. This is the standard or customary formation for the orifice of a disk of this character, the wide end of the hub orifice or passage being directed downstream in the pipe.

When the orifice disk, by which is meant the bodies 10, the insulation disks 11 and the resistance wire 15, is inserted in position in a union as shown in Fig. 1, current is passed through the resistance wire sufficient to heat the wire so that the formation of ice against the orifice disk will be prevented without heating or raising the temperature of the gas passing through the orifice. With this device, the interference of the flow of gas through the pipe line is prevented and a proper metering of the gas being by-passed through the passages 5, is obtained.

In Fig. 4, a slightly modified construction of the central portion or hub portion of the disk is illustrated. In the construction of Fig. 1, it will be noted that the hub is swaged over at each end against the adjacent plates or disks 10. In this modified construction, however, the hub is shown as being formed integrally with one of the plates, preferably the plate which is upon the back of the disk or, in other words, upon the side of the disk toward which the fluid in the pipe moves. This back disk is indicated by the numeral 10′ while the front disk is indicated by the numeral 10″. The hub which is indicated by the numeral 13′, is formed integrally with the back disk 10′ and has a circular seat 14′ on which the insulation disks or disks of asbestos fibre 11′, are mounted. The front disk or plate 10″ positions over the forward end of the hub which is reduced as shown from the seat portion 14′, and this front edge is swaged over as indicated at 13″, thus locking the front disk securely in position and to the hub and compressing the insulation disks 11′ firmly between the two plates.

What is claimed is:

1. A device of the character stated, comprising a flat disk body, including two spaced disk members and insulation material secured between the disk members, the body having a central orifice therethrough, means forming a radially extending handle for the body, and an electrical resistance wire embedded in said insulation material and having terminals extending longitudinally of the handle and from the outer end of the same.

2. In combination with an orifice union, including a pair of bodies and means for securing said bodies together, a metering disk comprising a relatively thin plate-like member having opposite faces plane throughout for interposition between said bodies, said member including a pair of centrally apertured disks, a connecting body passing through the apertures of said disks and joined to the opposite faces of the disks to maintain the same in cooperative relation, said connecting body having a relatively small passage therethrough, and an electric current resistance wire housed between said disks and lying in a plane paralleling said faces, said wire extending around said passage, said wire being designed to be connected with a source of electric potential.

3. An orifice disk for insertion between two separable members of an orifice union, comprising a pair of flat plates having central apertures and arranged with said apertures coaxially related, said plates having plane side faces, a hub member extending through said alined apertures and having a laterally turned flange at each end engaging over the outer face of the adjacent plate, said hub having an exterior encircling shoulder forming a spacing means for said plates, the hub having a relatively small axial passage therethrough, a disk-like unit of insulation material having a central aperture in which said shoulder positions, the said unit being supported upon the shoulder between the plates, and an electric current resistance wire enclosed in said unit and encircling said hub, said wire being designed for connection with the source of electric potential.

4. An orifice disk for insertion in an orifice union, comprising a pair of plate bodies disposed in spaced side by side relation, said plate bodies having plane outer surfaces, a hub member integrally connected at one end with one of said plate bodies and having its other end extending through an aperture in the other plate body, said hub member at the said other end thereof being turned over the outer face of the adjacent plate member, the hub having an encircling shoulder functioning to maintain said plate members in spaced parallel relation, said hub having a relatively small axial passage therethrough, a unit of insulation material interposed between said plate members and having a central aperture in which said shoulder is received, the shoulder supporting the unit in position between the members, and an electric current resistance wire enclosed within the unit of insulation material and encircling said hub, said wire being designed for connection in circuit with a source of electric potential.

5. An orifice disk for insertion between two spaced members in an orifice union, comprising a pair of relatively thin disk bodies, each of said bodies having an integral radially extending arm, the bodies being disposed in spaced parallel and coaxial relation with said arms in spaced parallel relation, means forming a hub member connecting said disk members together at the axial centers thereof and having a relatively small axial orifice therethrough, the hub member having an encircling shoulder between its ends functioning to keep the disk members in spaced relation, a unit of insulation material in the form of a disk interposed between the disk bodies and having a central aperture receiving the shoulder of said hub, said unit having an arm corresponding with the disk arms and extending outwardly between the same, and an electric current resistance wire embedded within the unit and encircling the hub and lying in a single plane extending transversely of the hub, the ends of said wire extending lengthwise of and through the arm portion of the insulation unit and being adapted for connection in circuit with a source of electric potential.

SIDNEY L. WORTHEN.